United States Patent [19]

Wang et al.

[11] 4,216,137

[45] Aug. 5, 1980

[54] THERMALLY STABILIZED POLYOLEFIN COMPOSITIONS

[75] Inventors: Richard H. S. Wang; Gether Irick, Jr., both of Kingsport, Tenn.

[73] Assignee: Eastman Kodak Company, Rochester, N.Y.

[21] Appl. No.: 912,632

[22] Filed: Jun. 5, 1978

[51] Int. Cl.² ............ C08K 5/51; C08L 23/06; C08L 23/12
[52] U.S. Cl. ............ 260/42.46; 260/45.9 NP; 260/45.8 N; 525/149
[58] Field of Search ......... 260/897, 45.9 NP, 45.8 N, 260/42.46

[56] References Cited

U.S. PATENT DOCUMENTS

| | | | |
|---|---|---|---|
| 2,606,886 | 8/1952 | Amberg | 260/23.7 M X |
| 2,866,773 | 12/1958 | Redfarm | 260/47 |
| 3,378,516 | 4/1968 | Tholstrup et al. | 260/45.8 |
| 3,667,922 | 6/1972 | Proctor et al. | 23/357 |
| 4,080,361 | 3/1978 | Wang et al. | 260/45.9 NP |

*Primary Examiner*—Carman J. Seccuro
*Attorney, Agent, or Firm*—J. Frederick Thomsen; Daniel B. Reece, III

[57] ABSTRACT

Polyolefins are rendered resistant to degradation upon exposure to heat by incorporating therein a stabilizing amount of a synergistic combination of a phenol-terpene resin, a sulfur-containing secondary antioxidant and a phosphonitrilic composition derived rom a phosphonitrilic halide and certain hydroxy compounds. The above synergistic combination is especially effective for stabilizing polyolefins containing carbon black.

7 Claims, No Drawings

THERMALLY STABILIZED POLYOLEFIN COMPOSITIONS

This invention relates to a novel stabilizer combination useful for improving the resistance of olefin polymers to thermal degradation. This invention also pertains to olefin polymers containing a stabilizing amount of the novel stabilizer combination and, especially, to olefin polymers so stabilized which additionally contain carbon black.

It is well known that polyolefins commonly are subjected to elevated temperatures during fabrication, such as rolling, molding or extruding, of useful materials and that the use of such materials frequently involves exposure to heat. Exposure to such elevated temperatures usually results in some degree of oxidative degradation of the polymer. Antioxidants or stabilizers, including a primary antioxidant, such as an ortho-hindered phenol, and a sulfur-containing secondary antioxidant (hydroperoxide decomposer), have been incorporated in polyolefins. In addition, organo-phosphorus compounds, such as distearyl pentaerythritol diphosphite have been employed in polyolefins.

We have discovered that improved stability to thermal degradation may be imparted to polyolefins by incorporating therein a stabilizing amount of a synergistic combination of a phenol-terpene resin, a conventional sulfur-containing secondary antioxidant and a compound derived from a phosphonitrilic halide and certain hydroxy compounds. We also have discovered that the synergistic combination of stabilizers is especially suitable for use in polyolefins containing carbon black. Our invention therefore includes (1) a polyolefin containing a stabilizing amount of the tricomponent synergistic combination of the above-described stabilizers and (2) a polyolefin containing both a stabilizing amount of such a combination and carbon black.

The phenol-terpene resins (A) useful in our invention are well-known materials which have been described in the literature such as, for example, U.S. Pat. No. 2,606,886. They are available commercially as Nirez 2040, 2092 and V-2150 (trademark of Tenneco Corp.) and Picco LTP-135 and XPS-377 (trademark of Pennsylvania Industrial Chemical Corp.). The sulfur-containing secondary antioxidants (B) useful in our invention also are well-known materials and include, for example, alkyl esters of thiodipropionic acid such as distearyl and dilauryl thiodipropionate, the sulfur-containing polyesters described in U.S. Pat. nos. 3,157,517 and 3,378,516, and dialkyldithiocarbamate such as nickel and zinc dibutyldithiocarbamates described in J. Poly. Sci., p. 1579 (1972) and German Pat. No. 1,234,023 (1967). The thiodipropionate esters are most commonly used and thus are preferred.

The organic phosphonitrilic component (C) of our novel synergistic stabilizer composition is derived from a phosphonitrilic halide, such as the chloride or bromide, and a hydroxy compound selected from alkanols containing 1 to about 20 carbon atoms, and diols having the formula

wherein X is a covalent bond or alkylene of 1 to about 12 carbon atoms, $R_1$ and $R_2$ are the same or different as hydrogen or alkyl having 1 to about 6 carbon atoms, and n is an integer from 1 to about 200. The phosphonitrilic halides, which may be prepared by known methods such as those disclosed in U.S. Pat. Nos. 3,347,643 and 3,667,922, are mixtures of compounds, a major portion, e.g., >90%, of which are cyclic compounds having the general formula $(PNCl_2)_n$ wherein n is 3 or more and a minor portion of which are linear polymers. The main component of the cyclic compounds is the trimer, i.e., a triphosphonitrilic halide. Examples of suitable alcohols useful in the preparation of the compounds of this invention are methanol, ethanol, propanol, isopropanol, butanol, octanol, n-decanol, 2-decanol, 3-decanol, octadecanol, 2-ethylhexanol, and the like. Examples of suitable glycols or diols which can be utilized in the preparation of the compounds of this invention are ethylene glycol, propanediol, butanediol, hexanediol, neopentyl glycol, and the like. Preferably the hydroxy compound is ethylene glycol, propylene glycol or an alkanol having up to about 12 carbon atoms. Thus, the preferred phosphonitrilic compounds consist primarily of compounds having the general formula $(PNOR^3R^4)_n$ wherein n is 3 or more of which the predominant compound is the trimer having the formula

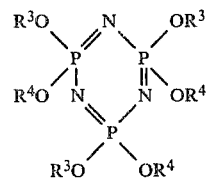

wherein $R^3$ and $R^4$ each is an alkyl group of up to about 12 carbon atoms, including a mixture or plurality of different alkyl groups, or each pair of $R^3$ and $R^4$ in combination can represent ethylene or propylene.

The thermally-stabilizing amount of the synergistic combination of A, B and C can be varied significantly depending, for example, on the end use for which a particular stabilized polyolefin composition is designed. Generally, a stabilizing effective amount of each of components A, B and C will fall within the percentage ranges of:

A: 0.1 to 20, preferably 0.1 to 10;
B: 0.01 to 10, preferably 0.1 to 5; and
C: 0.01 to 10, preferably 0.1 to 5.

The above percentages are by weight based on the weight of the polyolefin, exclusive of other additives, to which components A, B and C are added. The use of amounts below these ranges generally does not result in a satisfactory degree of stabilization whereas the use of larger amounts not only is expensive but can detrimentally affect the physical properties of the polyolefin composition.

A preferred embodiment of our invention comprises the stabilized polyolefin described above which also contains a pigmenting amount of carbon black. Amounts falling within the range of 0.1 to about 10 weight percent based on the weight of the polyolefin, exclusive of other additives, can be used. The stabilized compositions of our invention also can contain other conventional additives such as talc, titanium dioxide, silicas, metal deactivators, slip agents, flame retardants, antifungal agents, etc.

The olefin polymers which can be used in our novel stabilized compositions are those normally-solid homopolymers and copolymers of olefins having from 2 to 10 carbons, preferably α-olefins having 2 to 4 carbon atoms. Examples of such olefin polymers are polyethylene, polypropylene, polyallomer, poly-1-butene, poly-1-pentene, poly-1-octene and the like. The preferred polyolefins useful in the practice of our invention are polypropylene and polyethylene of varying densities.

The invention is further illustrated by the following examples.

EXAMPLE 1

Preparation of tris(ethylenedioxy) cyclotriphosphazene, (I): A solution of 22.5 g (0.36 mole) of ethylene glycol in 300 ml of pyridine was mixed with 23.4 g. (0.06 mole) of triphosphonitrilic chloride. The mixture was stirred for 30 minutes and then held at room temperature for 20 hours. The product was filtered and washed with water, ethylene alcohol, and methylene chloride (yield: 60%). Found (and calcd. for $C_6H_{12}N_3O_6P_3$/M.W. 315): C 22.7 (22.90); H 3.77 (3.84); N 13.30 (13.34); and P 27.27 (29.49).

EXAMPLE 2

Preparation of hexakis(butoxy)cyclotriphosphazene, (II): To a chilled solution (0°–5° C.) of triphosphonitrilic chloride (0.018 mole) in 26 ml of pyridine, butanol (0.34 mole) was added. The mixture was stirred at room temperature overnight, diluted with petroleum ether and washed with dilute HCl, NaHCO$_3$, and water successively. After removal of solvent, the product IIa was obtained in a yield of 90%. Found (and calcd. for $C_{24}H_{54}N_3O_6P_3$/M.W. 574): C 48.96 (50.25); H 9.29 (9.49); N 7.71 (7.33) and P 16.11 (16.23).

EXAMPLE 3

A number of stabilized polypropylene and polyethylene compositions were prepared by dry-blending the components, milling on an open two-roll mill and pressing into films or molding into sheets, bars and other shaped articles. The thermal stability of each composition was determined by suspending a film or molding thereof in an oven until embrittlement occurred. The compositions tested and their thermal stability in hours are set forth in the following tables. The two columns of figures in each table list the hours of heating in an oven at the temperature indicated until embrittlement occurred. The first column gives the results for natural compositions containing no carbon black whereas the second column of figures pertain to compositions containing carbon black (CB). The polypropylene compositions of Table 2 contain, in addition to the other components indicated, 40% talc. In Table 1, 5-mil films were tested; in Table 2, 10-mil films were tested and in Table 3, 65-mil molded sheets were tested.

Table 1

| | | Polypropylene | |
|---|---|---|---|
| | Stabilizers | Natural, 150° C. | 3% CB, 150° C. |
| 1. | None | <1 | 7 |
| 2. | 0.1% Irganox 1010[1] | 740 | 40 |
| 3. | 1.0% Nirez V-2150[2] | 300 | 150 |
| 4. | 3 + 0.3% DLTDP[3] | 700 | 320 |
| 5. | 3 + 0.3% II | — | 380 |
| 6. | 4 + 0.3% II | — | 930 |
| 7. | 3 + 0.3% I | 750 | — |

[1]Tetrakis[3-(3,5-di-tert-butyl-4-hydroxyphenyl)propionyloxymethyl] methane, Ciba-Geigy
[2]Terpene phenol resin, Tenneco
[3]Dilauryl 3,3'-thiodipropionate, American Cyanamid Table 2

| | | 40% Talc-Filled Polypropylene | |
|---|---|---|---|
| | Stabilizer | Natural, 150° C. | 1% CB, 150° C. |
| 1. | None | 2 | 5 |
| 2. | 0.5% Irganox 1010 | 600 | 500 |
| 3. | 1.0% Nirez V-2150 | 300 | 300 |
| 4. | 2 + 0.3% DLTDP + 0.3% II | 1170 | 600 |
| 5. | 2 + 0.3% DLTDP + 0.3% Naugard P-HR[1] | 900 | 600 |
| 6 | 3 + 0.3 DLTDP + 0.3% II | 1200 | 1000 |
| 7. | 3 + 0.3% DLTDP + 0.3% Naugard P-HR | 720 | 720 |
| 8. | 3 + 0.3% II | 650 | 570 |

[1]Tris(mixed mono/di-nonylphenyl) phosphite, Naugatuck

Table 3

| | | Polyethylene | |
|---|---|---|---|
| | Stabilizer | Natural, 140° C. | 3% CB, 140° C. |
| 1. | None | 35 | 100 |
| 2. | 0.1% Irganox 1010 | >1800 | 285 |
| 3. | 1.0% Nirez V-2150 | 320 | 350 |
| 4. | 3 + 0.3% | 1040 | 830 |
| 5. | 4 + 0.3% DLTDP | — | >3078 |

The data set forth in the above tables establishes the excellent thermal stability possessed by the novel stabilized polyolefin compositions of our invention. The thermal stability of Composition 6 of each of Tables 1 and 2 and Composition 5 of Table 3 indicates the particularly good results that are achieved when using the synergistic stabilizer combination of our invention in polyolefins containing carbon black.

The invention has been described in detail with particular reference to certain preferred embodiments thereof, but it will be understood that variations and modifications can be effected within the spirit and scope of the invention.

We claim:

1. A polyolefin composition containing, based on the weight of the polyolefin, about 0.1 to 10 weight percent of a phenol terpene resin, about 0.1 to 5 weight percent of a sulfur-containing secondary antioxidant and about 0.1 to 5 weight percent of a phosphonitrilic composition derived from a phosphonitrilic halide and a hydroxy compound selected from an alkanol containing 1 to 20 carbon atoms and a diol having the formula

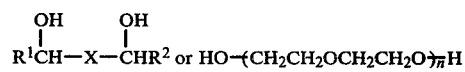

wherein X is a covalent bond or alkylene of 1 to about 12 carbon atoms, $R^1$ and $R^2$ are the same or different and are hydrogen or alkyl having 1 to about 6 carbon atoms and n is an integer of 1 to about 200.

2. A polyolefin composition according to claim 1 comprising a polymer of an α-olefin of 2 to 4 carbon atoms containing, based on the weight of the polymer, about 0.1 to 10 weight percent of a terepene phenol resin, about 0.1 to 5 weight percent of a sulfur-containing secondary antioxidant and about 0.1 to 5 weight percent of the phosphonitrilic composition defined in claim 1.

3. A polyolefin composition according to claim 1 comprising polyethylene or polypropylene containing, based on the weight of the polyethylene or polypropylene, about 0.1 to 10 weight percent of a terpene phenol resin, about 0.1 to 5 weight percent of distearyl or dilauryl thiodipropionate and about 0.1 to 5 weight percent of a triphosphonitrilic composition wherein the predominant compound is the trimer having the formula

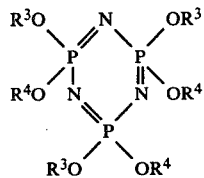

wherein $R^3$ and $R^4$ each is an alkyl group of up to 12 carbon atoms or each pair of $R^3$ and $R^4$ in combination represent ethylene or propylene.

4. The polyolefin composition of claim 1 which additionally contains a pigmenting amount of carbon black.

5. The polyolefin composition of claim 2 which additionally contains a pigmenting amount of carbon black.

6. The polyolefin composition of claim 3 which additionally contains, based on the weight of the polyethylene or polypropylene, about 0.1 to 10 weight percent of carbon black.

7. A polyolefin composition containing a stabilizing amount of a combination of a phenol terpene resin, sulfur-containing secondary antioxidant and a phosphonitrilic composition which is the reaction product of a phosphonitrilic halide and a hydroxy compound selected from an alkanol containing 1 to 20 carbon atoms and a diol having the formula

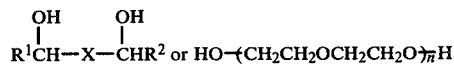

wherein X is a covalent bond or alkylene of 1 to about 12 carbon atoms, $R^1$ and $R^2$ are the same or different and are hydrogen or alkyl having 1 to about 6 carbon atoms and n is an integer of 1 to about 200, wherein the combination is made up of, based on the weight of the polyolefin, about 0.1 to 10 weight percent of a terpene phenol resin, about 0.1 to 5 weight percent of distearyl or dilauryl thiodipropionate and about 0.1 to 5 weight percent of the phosphonitrilic composition.

* * * * *